United States Patent
Anvari

(12) 
(10) Patent No.: US 6,430,237 B1
(45) Date of Patent: Aug. 6, 2002

(54) METHOD FOR ACCURATE SIGNAL-TO-INTERFERENCE MEASUREMENT FOR WIRELESS COMMUNICATION RECEIVERS

(75) Inventor: Kiomars Anvari, Alamo, CA (US)

(73) Assignee: Transamerica Business Credit Corporation, Rosemont, IL (US)

( * ) Notice: Subject to any disclaimer, the term of this patent is extended or adjusted under 35 U.S.C. 154(b) by 0 days.

(21) Appl. No.: 09/193,216

(22) Filed: Nov. 16, 1998

(51) Int. Cl.$^7$ .......................... H03D 1/00; H04B 17/00

(52) U.S. Cl. .................... 375/343; 455/67.3; 455/226.3

(58) Field of Search ................................. 375/343, 316, 375/224, 226, 150, 152; 455/67.1, 226.1, 67.3, 226.3, 296

(56) References Cited

U.S. PATENT DOCUMENTS

| | | | | |
|---|---|---|---|---|
| 4,835,790 A | * | 5/1989 | Yoshida et al. | 375/227 |
| 5,157,694 A | * | 10/1992 | Iwasaki et al. | 375/327 |
| 6,028,894 A | * | 2/2000 | Oishi et al. | 375/227 |
| 6,069,912 A | * | 5/2000 | Sawahashi et al. | 375/142 |

* cited by examiner

*Primary Examiner*—Chi Pham
*Assistant Examiner*—Khai Tran
(74) *Attorney, Agent, or Firm*—Townsend and Townsend and Crew LLP; Kenneth R. Allen

(57) ABSTRACT

An interference measurement technique in for example a wireless receiver uses a received, unprocessed signal and correlates it with a signal reconstructed from detected information, then compares a square of the correlated signal with a square of the received signal to produce a signal-to-interference metric useful for evaluating a channel quality, such as in a wireless telecommunication environment.

12 Claims, 1 Drawing Sheet

METHOD FOR ACCURATE SIGNAL-TO-INTERFERENCE MEASUREMENT FOR WIRELESS COMMUNICATION RECEIVERS

BACKGROUND OF THE INVENTION

This invention relates to communication receivers and particularly to techniques for measuring a signal-to-interference ratio. The invention is useful in wireless telecommunication systems, especially mobile communication systems.

In wireless communication systems, co-channel interference is a principal source of performance degradation as well as of system capacity limitations. When a wireless system is used in a cellular environment, a terminal unit and a base station are needed to monitor the system performance and to use that system performance as the criterion for hand-off from one cell to another cell. A wireless communication channel may be limited by either noise or interference. The parameters which are usually used for the hand-off criteria are the receive signal strength, bit error rate, and signal-to-interference ratio (S/I). What is needed is a mechanism for accurately measuring those parameters.

SUMMARY OF THE INVENTION

According to the invention, in a receiver and in particular in a nonlinear receiver, a method and apparatus are provided for performing a signal-to-interference ratio measurement wherein detected information is used to estimate the interference power and a ratio calculation is made on signal power and interference power to yield a desired signal-to-interference ratio. Both the received signal and detected signal are used in the measurement. The received signal is used to calculate the accumulated power of the signal, noise, and interference. The signal power measurement of the received signal is determined by squaring the signal strength of the received signal. Simultaneously, the detected signal, that is the signal after the detection process has been undertaken, i.e., a reconstructed version of the signal from the detected information, is correlated with the received signal in order to provide a signal free of the interference and noise elements in the source signal. The power of the desired signal is calculated by squaring the output of the correlator. By taking the difference between the received signal power and the signal power of the desired signal, the power of the interference plus noise is calculated. When the channel is interference-limited, the power of the noise is negligible. Therefore, by dividing received signal power by the interference plus noise power, the signal to interference (S/I) ratio is calculated.

In a particular embodiment, a correlator receives as its inputs signal samples from a main receiver and so-called detected information produced by both the main receiver and a diversity receiver, where detected information is information expected to be received at the two receivers and which has been detected and mapped according to a preselected modulation format similar to the transmitted signal. This processed signal is then used to measure the power of the desired signal as it should have been received.

While, in one specific embodiment, the detector which produces one of the signals to the correlator uses as its inputs the received signals from both main and diversity receiver paths, in another specific embodiment the detector processes only the signal from a single receiver.

The invention is useful with hardlimited as well as linear received signals, and it can be used in receivers that receive continuous and burst signals. The accuracy of input measurement may be improved by increasing the measurement time.

The invention will be better understood by reference to the following detailed description in connection with the accompanying drawings.

DESCRIPTION OF SPECIFIC EMBODIMENTS

Figure 1:
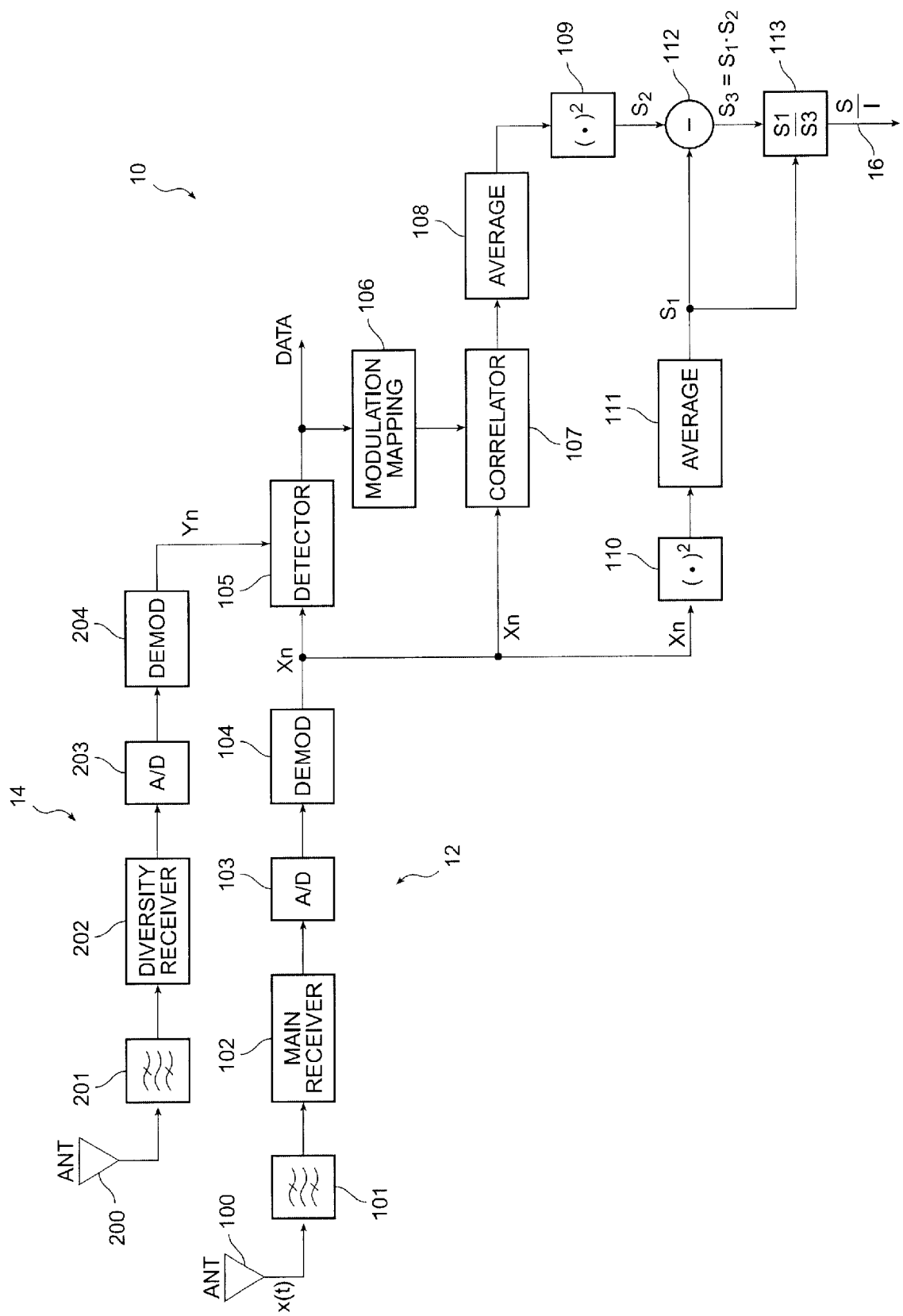
FIG. 1 is a block diagram of a communication receiver according to the invention using dual receivers.

FIG. 1 is a receiving system 10 with a main branch 12 and a diversity branch 14 which is used to estimate the signal to interference (S/I) ratio which is produced at an output 16.

In this specific embodiment, a main linear or nonlinear receiver 102 and a diversity linear or nonlinear receiver 202 each use a signal to interference ratio estimator which can operate on:

one branch only, the best branch based on a selection algorithm, or both branches.

For the sake of simplicity, the three cases are described in connection with a single receiver system. The degenerate case of one branch will be evident from the following description.

The receivers 102, 202 in the branches can be either linear or hard limited, which renders them nonlinear. In certain applications, such as certain types of pure digital modulation, nonlinear receivers are suitable.

In operation, a received signal from the main antenna 100 is coupled to and filtered by a first band-pass filter 101 and then applied to the main receiver 102. The output of the main receiver 102 is sampled by a first analog to digital (A/D) converter 103. The samples from A/D converter 103 are applied to a first downconverting digital demodulator 104 to produce a bandband digital signal.

Further, the received signal from a diversity antenna 200 is filtered by a second band-pass filter block 201 and then applied to the diversity receiver 202. The output of the diversity receiver 202 is sampled by a second analog to digital (A/D) converter 203. The samples from converter 203 are applied to a second downconverting digital demodulator 204 to produce the demodulated signal.

In this embodiment, the baseband outputs of each of downconverting demodulators 104 and 204 are applied to different inputs of a digital detector 105 to produce the detected information, as herein defined. The detector 105 may also have an imbedded voting function which selects the input from the channel having the higher received signal strength. No voting function is needed if there is no diversity signal channel. The detector 105 processes one or the other of the input signals in order to extract data, typically a binary-coded digital bit stream, which data is provided at a receiver system output.

According to the invention, in order to obtain a comparison between the received signal and the detected signal, it is necessary to remap the data output into a form similar to the received signal. For this purpose the data output of the detector 105 is mapped by a modulation mapper 106 back into the same modulation form as is the received signal, namely according to the format specified by the transmission standard and protocol of the system. Thereafter, the mapped information is applied to a first input of a correlator 107. A second input to the correlator 107 is provided from the output of the demodulator 104. Thus, the unprocessed received signal is cross-correlated with the detected and remodulation/remapped signal. The result is a correlated signal which differs from an autocorrelated signal only by the interference and other noise on the received signal.

The output of the correlator 107 is provided to a first averaging element 108 where this correlated output is averaged over time and then applied to a first squaring element 109 to obtain a power estimation of the desired signal. (Alternatively, the squaring function may precede averaging.) The squaring element may be a bit shifter for binary-formatted digital signals. The output of the demodulator 104 (or 204) is also applied to doubler 110 for power estimation. The output of the squaring element 110 is then averaged in a second averager 111 to estimate the power of the received, undetected signal. Similarly, the order of the averaging and the squaring functions may be reversed.

The outputs of the elements 111 and 109 are applied to a differencing element 112. While the parameters are not based on a common scale, the differencing element is able to produce as its output a value which in effect eliminates the common component or autocorrelated component of these phase-synchronous signals in order obtain an estimate the power of the interference component of the received signal. The power of the received signal from block 111 and power of the interference signal from differencing element 112 are applied to a ratio generating element 113 to obtain an estimate the signal-to-interference ratio, which is the desired output according to the invention.

This invention can be implemented in various embodiments. For example, the diversity channel can be omitted and all processing can be effected using a signal extracted from a single receiver. The invention can also be effected in an all analog configuration, assuming digital information can be extracted from the output of the detector.

The invention has been explained using a wireless receiver as a platform. However, the invention may be used in any signal transmission environment, such as a fiber optic or electronic LAN environment, to obtain a figure of merit useful for evaluation of channel quality.

The invention has been explained with reference to specific embodiments. Other embodiments will be apparent to those of ordinary skill in the art from the foregoing detailed description. It is therefore not intended that this invention be limited, except as indicated by the appended claims.

What is claimed is:

1. A method for evaluating quality of a communication channel at a receiving node, said method comprising steps:
   receiving a first representation of a signal to be measured to produce a received signal;
   detecting information in at least one representation of said signal to be measured in order to produce a detected signal; thereafter
   remapping said detected signal into a format corresponding to said received signal to obtain a remapped signal;
   cross-correlating said remapped signal and said received signal to obtain a cross-correlated signal;
   squaring amplitude of said received signal to produce a power representation of said received signal;
   squaring amplitude of said cross-correlated signal to produce a power representation of said cross-correlated signal;
   subtracting said cross-correlated signal power representation from said received signal power representation to obtain, as a difference signal, an interference signal power representation; and
   dividing said received signal power representation by said interference signal power representation to obtain a signal-to-interference ratio.

2. The method according to claim 1 wherein said detected signal is provided through a first channel of a main receiver and alternatively through a second channel of a diversity receiver.

3. The method according to claim 2 wherein said received signal is provided only through said first channel.

4. The method according to claim 2 wherein said detecting is performed on baseband digital signals.

5. The method according to claim 1 further including:
   time averaging said cross-correlated signal prior to said subtracting step; and
   time averaging said received signal prior to said subtracting step so that said signal-to-interference ratio is based on a time average of interference.

6. An apparatus for evaluating quality of a communication channel at a receiving node, said apparatus comprising:
   means coupled to receiving antenna means for receiving a representation of a signal to be measured to produce a received signal;
   means coupled to said receiving means for detecting information in at least one representation of said signal to be measured in order to produce a detected signal;
   means coupled to receive said detecting means for remapping said detected signal into a format corresponding to said received signal to obtain a remapped signal;
   means coupled to said remapping means and to said receiving means for cross-correlating said remapped signal and said received signal to obtain a cross-correlated signal;
   first means coupled to said receiving means for squaring amplitude of said received signal to produce a power representation of said received signal;
   second means coupled to said cross-correlating means for squaring amplitude of said cross-correlated signal to produce a power representation of said cross-correlated signal;
   means functionally coupled to said first squaring means and said second squaring means for subtracting said cross-correlated signal power representation from said received signal power representation to obtain, as a difference signal, an interference signal power representation; and
   means coupled to said subtracting means and to said first squaring means for dividing said received signal power representation by said interference signal power representation to obtain a signal-to-interference ratio.

7. The apparatus according to claim 6 wherein said detected signal is provided through a first channel of a main receiver and alternatively through a second channel of a diversity receiver.

8. The apparatus according to claim 7 wherein said received signal is provided only through said first channel.

9. The apparatus according to claim 7 further including means for converting said received signal to a baseband digital signal.

10. The apparatus according to claim 6 further including:
    means coupled to receive said cross-correlated signal for time averaging said cross-correlated signal prior to said subtracting means subtracting said cross-correlated signal power representation from said received signal power representation; and
    means coupled to receive said received signal and to provide output to said subtracting means and to said dividing means for time averaging said received signal prior to said subtracting means subtracting said cross-correlated signal power representation from said received signal power representation so that said ratio is based on a time average of interference.

11. An apparatus for measuring a figure of merit for evaluation of channel quality at a receiver comprising:

a main receiver for capturing a first received signal;

a diversity receiver for capturing a second received signal;

a signal detector coupled to said main receiver and said diversity receiver for extracting detected information from said first received signal and from said second received signal;

a modulation mapper coupled to said signal detector for reconstructing a detected signal from said detected information;

a cross-correlator coupled to receive said detected signal from said modulation mapper and to receive said received signal for correlating said detected signal and said received signal to produce a cross-correlated signal;

a first squaring element coupled to receive said cross-correlated signal for squaring said cross-correlated signal to produce a cross-correlated power signal;

a second squaring element coupled to receive said received signal for squaring said received signal to produce a received signal power signal;

a subtracting element coupled to receive said cross-correlated power signal and said received signal power signal to produce an interference power signal;

a ratio generating element coupled to receive said received signal power signal and said interference power signal to obtain said figure of merit for evaluation of channel quality.

12. The apparatus according to claim 11 further including:

a first time averaging means coupled to receive said cross-correlated signal for time averaging said cross-correlated signal prior to said subtracting element receiving said cross-correlated power signal; and a second time averaging means coupled to receive said received signal and to provide output to said subtracting element and to said ratio generating element means for time averaging said received signal prior to said subtracting element receiving said received signal power signal so that said figure of merit is based on a time average of interference.

* * * * *